ULTRAVIOLET ABSORPTION SPECTRUM OF DOXYCYCLINE ACETYLCYSTEINEATE

CONCENTRATION: 0,01 g/l IN DISTILLED WATER

POSITION OF THE MAXIMUMS:

273 nm $E_{1\,cm}^{1\%} = 250$ 350 nm $E_{1\,cm}^{1\%} = 197$

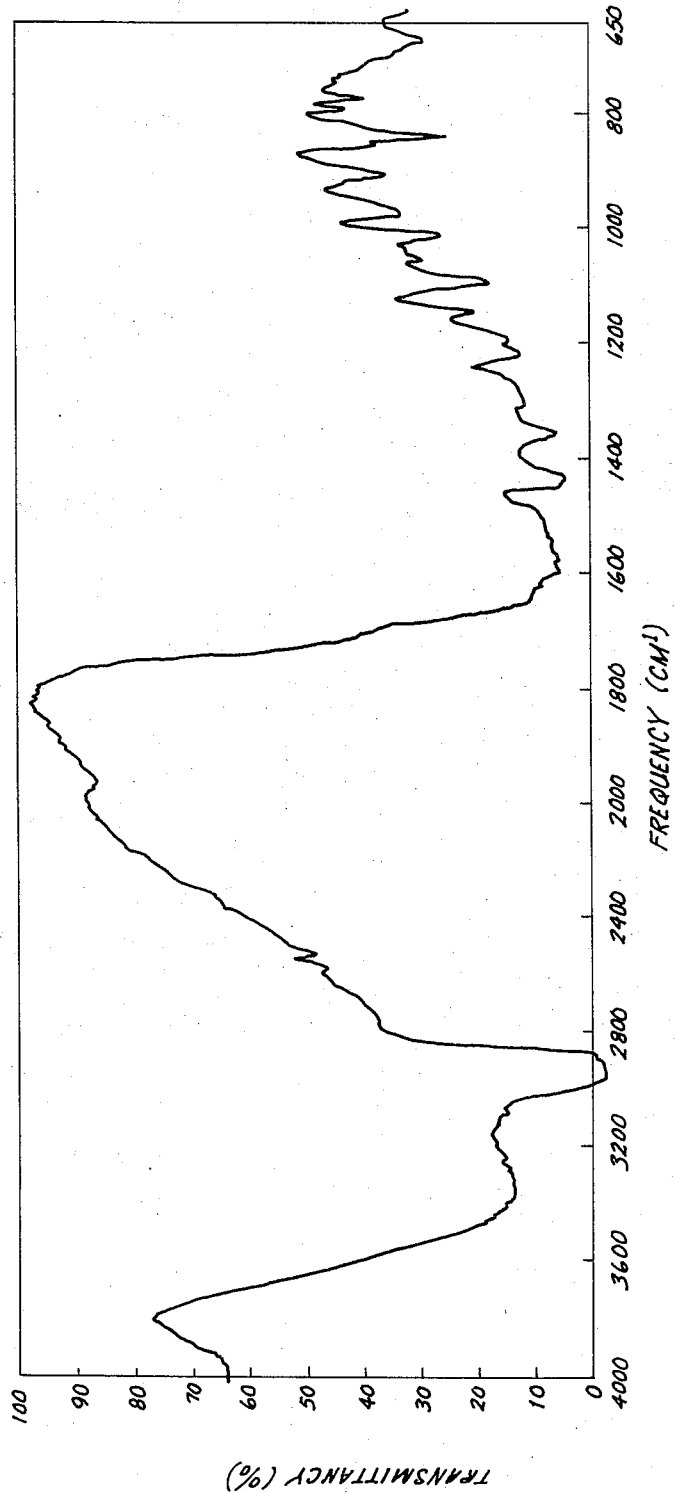

UNITED STATES PATENT OFFICE 3,847,973
Patented Nov. 12, 1974

3,847,973
DOXYCYCLINE ACETYLCYSTEINEATE
Luis Socias Vinals, Bilbao, Jose Rodriguez Blanco, Las Arenas, and Francisco Javier Ugalde Fernandez, Bilbao, Spain, assignors to Fabrica Espanola de Productos Quimicos y Farmaceuticos S.A., Lamiaco (Province of Vizcaya), Spain
Filed May 30, 1972, Ser. No. 258,082
Claims priority, application Spain, June 11, 1971, 392,136
Int. Cl. C07c 103/19
U.S. Cl. 260—501.12
1 Claim

ABSTRACT OF THE DISCLOSURE

Doxycycline acetylcysteinate is prepared by reacting doxycycline with acetylcysteine in a solvent. The compound is useful for the same pharmacological purposes as doxycycline and also possesses mucolytic property.

BACKGROUND OF THE INVENTION

This invention relates to doxycycline acetylcysteinate and a process for preparing same.

DESCRIPTION OF THE PRIOR ART

Doxycycline, the most modern wide spectrum antibiotic of the tetracycline group, surpasses its congeners in therapeutic efficacy because of its greater stability and better absorption in the gastrointestinal tract and very slow elimination by urination. Thus, after administration of doxycycline to a mammal, the concentration of it in the blood more rapidly reaches a higher and longer lasting level, thus permitting the use of a smaller dosage.

The acute toxicity of this antibiotic is very low (the $DL_{50}$ in mice is greater than 3984 mg./kg.) and the chronic toxicity is low also. In prolonged tests on mice for up to 180 days, using daily dosage thirty times higher than the average daily human therapeutically effective dosage, no anatomical or physiological histologic alterations have been observed in the test mice.

The activity of doxycycline determined by "in vitro" tests of various pathogenic organisms, including Gram-positive, Gram-negative, etc., is superior to that of tetracycline, so that its use is especially indicated in the treatment of pneumonia, broncho-pneumonia, acute bronchitis, pulmonary abscess and other respiratory illnesses.

In such cases it frequently happens that the bronchial glands secrete large quantities of tenacious mucus causing obstruction of the bronchial passages due to the accumulation of viscous mucus or exuded purulent mucus, which may become a grave clinical problem. Said obstruction may affect a part or the whole of the lung and produce atelectasis, emphysema or infection away from the mucous blockage. Such circumstances may render necessary prolonged medical treatment or even surgical removal of the infected tissue. Thus, it is of extreme importance to eliminate such secretions before such obstruction can occur with its serious consequences.

Acetylcysteine is a mucolytic of sure action, that functions by affecting a real chemical lysis, apparently breaking the disulphide links of the mucoproteins and thereby altering their molecules to a sufficient degree to notably reduce the viscosity thereof.

Acetylcysteine is indicated for the treatment of acute bronchitis in which it helps by eliminating the detritus, chronic bronchitis and especially bronchiectasis, pneumopathy, chronic supurative bronchopulmonary disorders, postoperational syndromes with bronchopulmonary anticipation, etc.

We have discovered doxycycline acetylcysteineate, a pharmaceutical compound useful for the treatment of the previously mentioned conditions. This compound can be obtained by a reaction between doxycycline and acetylcysteine. The formula of doxycycline acetylcysteinate is:

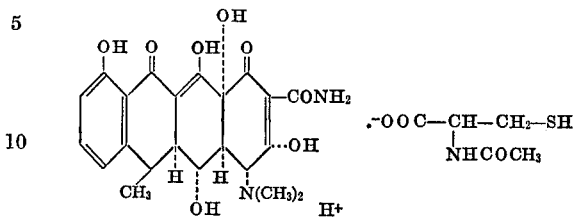

Experiments on laboratory animals have shown that doxycycline acetylcysteineate has a very low acute toxicity, via oral administration, similar to that of doxycycline. The same is true with regard to chronic toxicity. Prolonged tests of more than twenty weeks have shown that the growth rhythm of test animals treated with doxycycline acetylcysteineate is the same as that of the control animals. There is no alteration of glycemia, azotemia or haematic constitution. On necropsy following said tests, no histological or anatomical alterations of any kind could be detected.

In absorption tests in comparison with the doxycycline hyclate, no significative differences were observed in the concentrations in the blood plasma or in the rapidity with which such haematic levels were reached with both products. The mucolytic action of the product was observed in mice affected with experiental acute bronchitis.

Doxycycline acetylcysteineate is useful for the same pharmacological purposes as doxycycline and is administered in the dosage forms and amounts conventionally ficial antimicrobial properties of doxycycline, doxycycline acetylcysteineate also demonstrates a synergistic mucolytic effect that makes it useful for treating conditions in which a problem of mucus formation has occurred or is likely to occur.

In order to prepare the doxycycline acetylcysteineate compound according to this invention, a solution of doxycycline is made to react with acetylcysteine, both dissolved in a suitable inert solvent. Representative procedures for preparing the compound according to the invention are described in the following illustrative examples.

Example 1

Into an enamel-lined or glass vessel of about ten liters capacity, provided with stirrer and a thermometer and which is heated by a hot water bath, there is added a solution of 111.16 grams (0.25 mol.) of doxycycline dissolved in 8 liters of absolute ethyl alcohol, and the temperature of the solution is adjusted to 30°–35° C. The vessel is closed to prevent ingress of ambient moisture.

The solution of the starting material doxycycline can be obtained, if desired, from the corresponding hyclate salt by dissolving 128 grams (0.25 mol.) of this latter compound in a solution that contains 14 grams (0.25 mol.) of caustic potash in 8 liters of absolute ethyl alcohol and filtering the potassium chloride precipitate.

While stirring actively, there is added to the solution in the vessel, another solution comprising 41 grams (0.25 mol.) of acetylcysteine dissolved in 500 cm.³ of absolute ethyl alcohol. The temperature is maintained at 30°–35° C. After completing the addition, 5 grams of activated charcoal is added for decolorizing purposes and stirring is continued for another hour.

The liquid then is flowed under pressure through a filter to remove the charcoal, and thence to a rotary vacuum evaporator where the alcohol is evaporated at a pressure of 5–10 mm. Hg at a temperature of not more than 30° to 35° C.

The separated product is further dried in vacuum over concentrated sulphuric acid. The product is a crystalline powder, yellow in color, and which is highly soluble in water and lower alkanols. The yield is 150 grams of the solid product. 60–65% of the alcohol employed is recovered for reuse.

Example 2

In a similar vessel, but of about 25 liters capacity, provided with a stirrer and a thermometer and heated by hot water bath, a suspension is prepared by adding 2220 grams (5 mol.) of doxycycline to 15 liters of dioxane free from peroxides and the suspension is heated to 30°–35° C.

A solution of 815 grams (5 mol.) of acetylcysteine dissolved in a mixture of 2720 cm.$^3$ of dioxane, also free of peroxides, and 4450 cm.$^3$ of distilled water is gradually added to the vessel. As the addition progresses, the doxycycline continues to dissolve and finally there is obtained a liquid which has a very slight turbidity. The reaction mixture is stirred for an hour with 30 g. of activated charcoal and then is filtered through a sterilized filter in a sterile atmosphere.

The limpid and slightly yellow liquid is lyophilized to obtain solid particles of the doxycycline acetylcysteineate or it is formed into doses in vials after previously being congealed at −20° C. and then the lyophilization is completed with a final drying period of two hours at 40° C. and 10 microns pressure, after which the vials are closed or the product is bottled and sterilized. 3000 grams of doxycycline acetylcysteineate product are obtained and this product has characteristics similar to those given in Example 1.

Element analyses of the compounds prepared by Examples 1 and 2 was as follows:

|   | Theory, percent | Found (Example 1) | Found (Example 2) |
|---|---|---|---|
| C | 53.37 | 53.87 | 53.83 |
| H | 5.47 | 5.52 | 5.58 |
| N | 6.92 | 6.58 | 6.53 |
| S | 5.28 | 5.09 | 5.12 |

The melting point of the compound is 100–101° C. (with decomposition).

BRIEF DESCRIPTION OF DRAWINGS

FIG. 2 is the infrared absorption spectrum of doxycycline acetylcysteineate, mull with Nujol.

Figure 1:
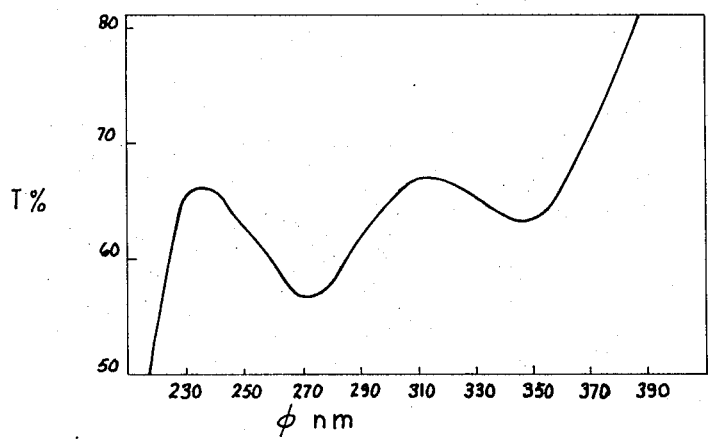
FIG. 1 is the ultraviolet absorption spectrum of doxycycline acetylcysteineate.

The embodiments of the invention in which an exclusive property or privilege is claimed are defined as follows:

1. Doxycycline acetylcysteinate.

References Cited

UNITED STATES PATENTS 3,128,227   4/1964   Karegis et al. ____ 260—559 AT

OTHER REFERENCES

Merck Index, 1968, 8th Edition, pp. 10 and 398 relied on.

DONALD G. DAUS, Primary Examiner

A. M. T. TIGHE, Assisant Examiner

U.S. Cl. X.R.

260—559 AT; 424—227